(12) United States Patent
Järvinen et al.

(10) Patent No.: US 9,133,927 B2
(45) Date of Patent: Sep. 15, 2015

(54) METHOD FOR CONTROLLING LUBRICATION OF A GEAR UNIT AND A GEAR UNIT

(71) Applicant: MOVENTAS GEARS OY, Jyväskylä (FI)

(72) Inventors: Mikko Järvinen, Palokka (FI); Sakari Hartikka, Tikkakoski (FI); Jarno Huikko, Korpilahti (FI); Mikko Koponen, Jämsä (FI)

(73) Assignee: MOVENTAS GEARS OY, Jyvaskyla (FI)

( * ) Notice: Subject to any disclaimer, the term of this patent is extended or adjusted under 35 U.S.C. 154(b) by 122 days.

(21) Appl. No.: 13/624,571

(22) Filed: Sep. 21, 2012

(65) Prior Publication Data
US 2013/0074630 A1 Mar. 28, 2013

(30) Foreign Application Priority Data
Sep. 22, 2011 (EP) .................................... 11182344

(51) Int. Cl.
*F16H 57/04* (2010.01)

(52) U.S. Cl.
CPC ........ *F16H 57/0413* (2013.01); *F16H 57/0447* (2013.01); *F16H 57/0456* (2013.01); *F16H 57/0457* (2013.01); *F16H 57/0486* (2013.01); Y10T 74/19991 (2015.01)

(58) Field of Classification Search
CPC ............ F16H 57/0413; F16H 57/0447; F16H 57/0457; Y10T 74/19991; F16N 7/385

USPC .................................. 184/6.12; 74/467; 173/2
See application file for complete search history.

(56) References Cited

U.S. PATENT DOCUMENTS

| | | | | |
|---|---|---|---|---|
| 1,220,810 | A * | 3/1917 | Alquist | 184/6.12 |
| 1,987,303 | A * | 1/1935 | McVeigh | 184/6.3 |
| 2,026,662 | A * | 1/1936 | Watson | 184/6.3 |
| 4,169,519 | A * | 10/1979 | Hirt et al. | 184/6.3 |
| 4,736,819 | A * | 4/1988 | Muller | 184/6.12 |
| 4,967,881 | A * | 11/1990 | Meuer et al. | 184/7.4 |
| 5,433,590 | A * | 7/1995 | Klaus et al. | 418/85 |
| 6,092,628 | A * | 7/2000 | Hinton et al. | 184/6.22 |
| 6,105,724 | A * | 8/2000 | Stitz et al. | 184/7.4 |
| 6,941,922 | B2 * | 9/2005 | Williams et al. | 123/196 R |
| 8,196,707 | B2 * | 6/2012 | Kardos | 184/6.12 |
| 8,622,120 | B2 * | 1/2014 | Gerundt et al. | 165/202 |
| 2005/0034925 | A1 * | 2/2005 | Flamang et al. | 184/6.12 |
| 2008/0296121 | A1 * | 12/2008 | Miyazaki et al. | 192/113.3 |
| 2008/0308353 | A1 * | 12/2008 | Aixala | 184/6.5 |
| 2010/0135793 | A1 | 6/2010 | Krauss | |

(Continued)

FOREIGN PATENT DOCUMENTS

EP 2251566 A1 11/2010

*Primary Examiner* — Michael Mansen
*Assistant Examiner* — Michael Riegelman
(74) *Attorney, Agent, or Firm* — Birch, Stewart, Kolasch & Birch, LLP

(57) ABSTRACT

A method for controlling lubrication of a gear unit, where the lubrication method of the gear unit is changed between circulating lubrication and splash lubrication during operation of the gear unit, wherein the temperature of the lubrication fluid is measured, and the change between circulation lubrication and splash lubrication is based on the measured temperature of the lubrication fluid. The invention also relates to such a gear unit.

4 Claims, 1 Drawing Sheet

(56) References Cited

U.S. PATENT DOCUMENTS

| | | |
|---|---|---|
| 2010/0329869 A1 | 12/2010 | Okano |
| 2011/0168495 A1* | 7/2011 | Subramaniam et al. ..... 184/6.12 |
| 2012/0241258 A1* | 9/2012 | Subramaniam et al. ....... 184/6.4 |
| 2013/0074628 A1* | 3/2013 | Uusitalo et al. ................. 74/467 |
| 2013/0074629 A1* | 3/2013 | Huikko et al. .................. 74/467 |
| 2013/0074630 A1* | 3/2013 | Jarvinen et al. ................. 74/467 |
| 2013/0075198 A1* | 3/2013 | Uusitalo et al. .............. 184/6.12 |
| 2013/0152882 A1* | 6/2013 | Potter ........................ 123/41.33 |
| 2014/0335990 A1* | 11/2014 | Martucci et al. .............. 475/160 |

* cited by examiner

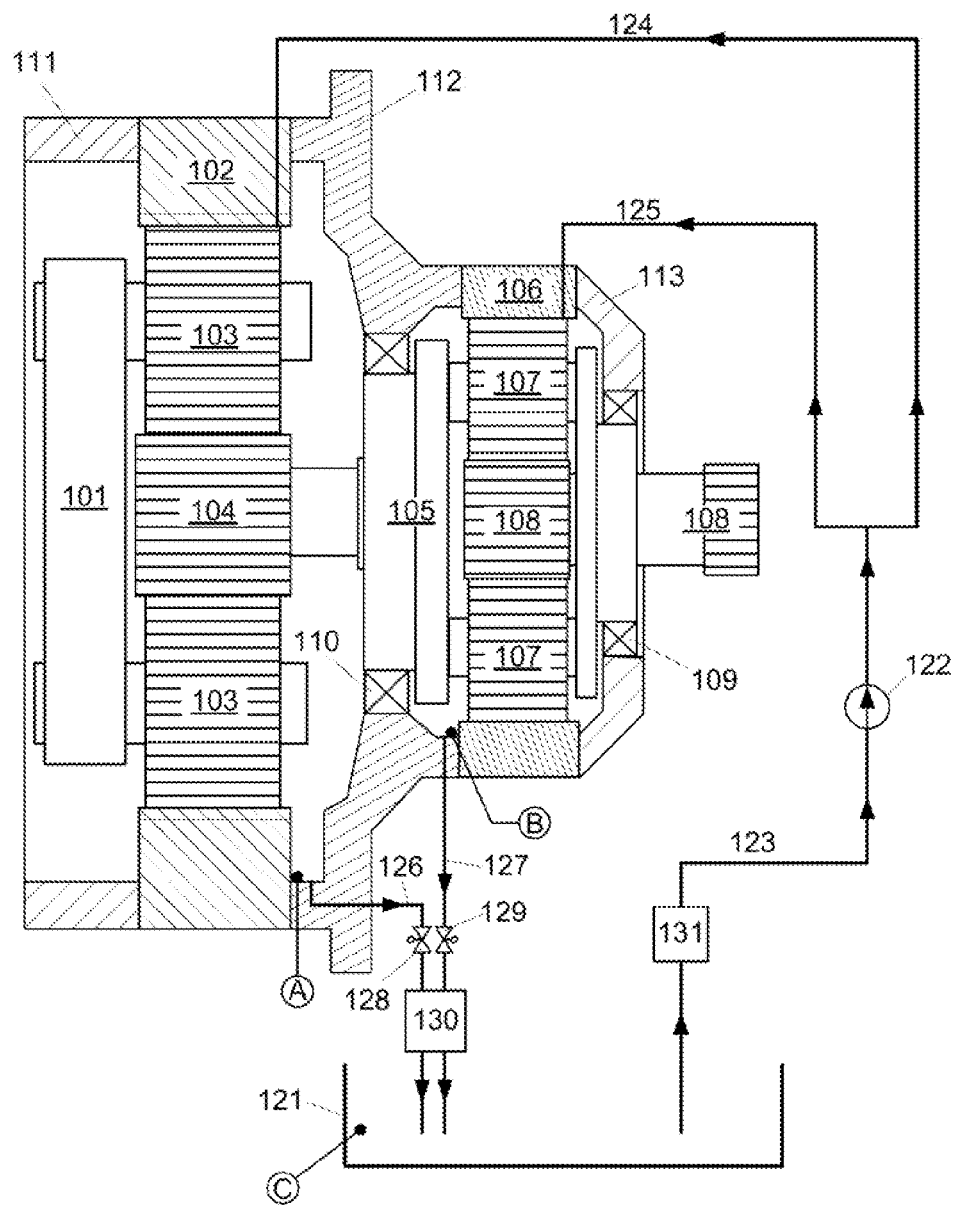

METHOD FOR CONTROLLING LUBRICATION OF A GEAR UNIT AND A GEAR UNIT

FIELD OF THE INVENTION

The present invention relates to a method for controlling lubrication of a gear unit in such a way that the lubrication method is changed based on the temperature of the lubrication fluid. The invention also relates to a gear unit utilizing this method.

BACKGROUND

In this description we use the term gearwheel to refer to a cogged, rotating machine part. Two or more meshing gearwheels constitute a gear stage. The term gear as such refers in this description to a mechanical system having a first shaft and a second shaft, between which one or more gear stages provide speed and torque conversions and/or a change in a direction of a rotation axis. A gear unit comprises a gear proper and may comprise auxiliary augmenting systems, such as instrumentation, control, and lubrication arrangements.

A lubrication system of a gear unit comprises typically a lubrication pump that is arranged to circulate lubrication fluid, such as oil, through a gear stage or gear stages of the gear unit and through bearings of the gear unit. As the viscosity of the lubrication fluid, especially in case of lubrication oils, is usually strongly dependent on temperature, the lubrication pump has to be designed and operated in way that the lubrication pump is not damaged even if the lubrication fluid is cold and thereby its viscosity is relatively high.

Due to this high viscosity of the cold lubrication fluid, especially when starting up a machinery comprising the gear unit, the viscosity of the lubrication fluid often need to be lowered by warming up the lubrication oil. This warming up of the lubrication fluid is usually achieved by equipping the lubrication system of the gear unit with pre-heaters.

The use of the pre-heaters and robust design specifications for the lubrication fluid pump, among others, raises the complexity and cost of a gear unit.

Another type of lubrication method used in enclosed gear units is splash lubrication. In splash lubrication, the gearwheel tooth dip into a tray of lubricant and transfer the lubricant to the meshing gearwheels as the gearwheels rotate.

Publication DE 32 31 016 discloses a solution where circulation lubrication and splash lubrication is used in the same gear unit. In this solution the change from circulation lubrication to splash lubrication takes place by means of a control device when the current supply to the gear unit is cut off. This way the gearwheels of the gear unit remains lubricated even during electrical power failure.

Publication GB 2 201 200 discloses a method of lubricating gear means for a wind energy installation that comprises the steps of maintaining operational lubrication by an oil-circulating system with injection lubrication, with the oil being cooled at the same time. In this solution the normal height of the oil level in the gear means casing is increased to a height necessary for splash lubrication when the rotational speed of the gear means falls below a settable value.

SUMMARY

In a method for controlling lubrication of a gear unit according to the invention, the lubrication method of the gear unit is changed between circulating lubrication and splash lubrication during operation of the gear unit, wherein the temperature of the lubrication fluid is measured, and the change between circulation lubrication and splash lubrication is based on the measured temperature of the lubrication fluid.

A gear unit according to the invention comprises:
 a first shaft and a second shaft for connecting to an external mechanical system,
 at least one gear stage between the first and second shafts,
 a channeling for directing lubrication fluid to flow through the at least one gear stage and bearings of the gear,
 a lubrication pump for pumping the lubrication fluid to the channeling so as to provide circulation lubrication,
 a lubrication fluid sump for containing the lubrication oil so as to provide splash lubrication,
 a controllable valve system for emptying the lubrication fluid sump so as to deactivate the splash lubrication, and
 the gear unit comprises at least one temperature sensor for measuring temperature of the lubrication fluid, and means for changing the lubrication of the gear unit between circulation lubrication and splash lubrication based on the temperature measurement of the lubrication fluid.

In the solution according to the present invention the temperature of the lubrication fluid is measured and when the temperature of the lubrication fluid is below preset value the gear unit is lubricated by splash lubrication. When the lubrication fluid warms during the operation of the gear unit and the temperature of the lubrication fluid reaches the same or another preset value, then the lubrication method is changed to circulation lubrication.

In a solution in accordance with the present invention there can also be two preset lubrication fluid temperatures on which the changing of the lubrication of the gear unit is based. In this case both splash lubrication and circulation lubrication can be used simultaneously when lubrication fluid temperature are between the two preset temperature values.

With a solution in accordance with the present invention the splash lubrication method is used to warm up the lubrication fluid at a suitable temperature and therefore lower the viscosity of the lubrication fluid to a suitable level before changing to circulating lubrication. This way the elements of the circulating lubrication system can be designed less robust, since the range of variation for viscosity of the lubrication fluid is much smaller than in similar prior art systems. Also, since the warming of the lubrication fluid is achieved with energy from the operation of the gear unit, the need for separate pre-heaters for heating the lubrication fluid may be eliminated, which makes the lubrication system less complex.

Other advantages obtained with a solution in accordance with the present invention include:
 when compared to pure splash lubrication, the solution in accordance with the present invention improves the efficiency of the gear unit,
 the present invention enables the use of the gear unit in broader climatic operating conditions, especially in cold conditions,
 the present invention enables the heating of the lubrication fluid with mechanical energy instead of electrical energy and thereby lower the operating costs of the gear unit,
 the present invention extends the operational life of the lubrication fluid by extending the required fluid change period and thereby also lower the operating costs of the gear unit, and
 the present invention reduces the foaming of the lubrication fluid which has been verified to reduce the lubrication and heat transfer qualities of a lubrication fluid.

In the present invention the lubrication is advantageously changed by an automatic lubrication control system, in which the preset lubrication fluid temperature values are programmed, and which automatic control system follows the temperature of the lubrication fluid based on the temperature measurements from temperature sensors.

The lubrication fluid used in the solution in accordance with the present invention is advantageously lubrication oil.

BRIEF DESCRIPTION OF THE FIGURES

The exemplifying embodiment of the invention and its advantages are explained in greater detail below in the sense of example and with reference to the accompanying drawing, which FIG. 1 shows a schematic section view of a gear unit in accordance with the present invention.

DESCRIPTION OF THE EMBODIMENT

FIG. 1 shows a schematic section view of a gear unit according to an advantageous, exemplifying embodiment of the invention.

The gear unit disclosed in FIG. 1 is a planetary gear unit comprising two planet-gear stages. The first planet-gear stage comprises a planet-wheel carrier 101, a gear ring 102, planet wheels 103, and a sun gear shaft 104. The second planet-gear stage comprises a planet-wheel carrier 105, a gear ring 106, planet wheels 107, and a sun gear shaft 108. The planet-wheel carrier 101 of the first planet-gear stage constitutes a part of a mechanical interface structure arranged to receive the mechanical power from a suitable prime mover. Therefore, the planet-wheel carrier 101 of the first planet-gear stage is rotated by the prime mover. The gear ring 102 is stationary. The sun gear shaft 104 of the first planet-gear stage is connected to the planet-wheel carrier 105 of the second planet-gear stage. Therefore, the planet-wheel carrier 105 of the second planet-gear stage is rotated by the sun gear shaft 104 of the first planet-gear stage. The gear ring 106 is stationary. The sun gear shaft 108 of the second planet-gear stage may be connected to a rotor of a generator, for example. In the gear unit shown in FIG. 1, the sun gear shaft 108 of the second planet-gear stage is floating on support of the planet-wheels 107 of the second planet-gear stage. The sun gear shaft 104 of the first planet-gear stage is floating on support of the planet-wheels 104 of the first planet-gear stage and on support of the planet-wheel carrier 105 of the second planet-gear stage. It is, however, also possible that one or both of the sun gear shafts is/are bearing-mounted.

In the embodiment of FIG. 1, the stationary gear ring 102 forms part of the frame of the first gear stage, and the stationary gear ring 106 form part of the frame of the second gear stage. It should be noted, that within the context of the present invention the stationary gear rings 102 and 106 can be enclosed within the frames of the gear stages, or these gear rings can be rotatable gear rings whereby they must be enclosed by the frames. Therefore, the frame of the gear unit, which in the embodiment of FIG. 1 comprises frame parts 111, 112 and 113 in addition to the gear rings 102 and 106, may be manufactured as a single entity, in a single casting, for example. This kind of single frame piece for the gear unit enhances the structural strength of the frame, and allows for better conveying of the forces from within the gear unit to the frame of the unit and from there to suitable external mechanical fastening structures.

The gear unit of FIG. 1 also has a lubrication system for lubricating the gears of the gear stages. In the embodiment of FIG. 1, the lubrication system comprises lubrication fluid tank, which in this case is a lubrication oil tank 121, a lubrication oil pump 122, lubrication channeling 123-125 for feeding the lubrication oil into the gear unit, lubrication channeling 126, 127 for draining lubrication oil from the gear unit, and controllable valves 128, 129 for controlling the amount of lubrication oil from the gear unit. The lubrication system can also comprise other elements known to a person skilled in the art, such as a lubrication cooling element 130, lubrication oil filter element 131, and lubrication oil pre-heating element (not shown), for example.

The lubrication system of FIG. 1 may, and almost always do, also comprise arranged lubrication for the bearings 109 and 110. The lubrication of the bearings 109 and 110 is not shown in FIG. 1 for sake of simplicity.

The lubrication system also comprises temperature sensors A-C for measuring the temperature of the lubrication oil. The temperature s—measures the temperature of the lubrication oil located within frame or casing of the first gear stage, the temperature sensor B measures the temperature of the lubrication oil located within the frame or casing of the second gear stage, and the temperature sensor C measures the temperature of the lubrication oils located inside the lubrication oil tank 121.

When the gear unit of FIG. 1 is operated while the lubrication oil is cold, i.e. the temperature of the lubrication oil is below preset temperature value, or started up, only splash lubrication is used for lubricating the gear stages of the gear unit. This is achieved by raising the lubrication oil level within the frames of the gear stages to a height where the lubrication oil level cover the lower parts of the gear wheels 102 and 106. The raising of the oil level within the frames of the gear stages can be achieved by feeding lubrication oil from the lubrication oil tank 121 through lubrication oil channels 123, 124 and 125 with the lubrication oil pump 122, while the controllable valves 128 and 129 located in the lubrication oil channels 126 and 127 are closed. Optionally, especially in situations where the gear unit is operated in cold conditions, the amount of lubrication oil suitable for splash lubrication can be fed inside the gear unit prior to shutting down the operation of the gear unit, so that the splash lubrication can be used immediately when the gear unit operation is resumed.

When the temperature of the lubrication oil within the frames of the gear stages, which temperature is measured with the temperature sensors A and B, raises to a first preset temperature value due the heat created by the operation of the gear unit, the circulation lubrication is started by starting up the oil pump 122 and opening controllable valves 128 and 129 at least partially. The temperature of the lubrication oil within the lubrication oil tank 121 is measure with the temperature sensor 3, and the lubrication oil in the oil tank can be heated during the operation of the gear unit with a separate pre-heater or with the heat received from the operating gear unit, for example. The temperature measurement of the lubrication oil in the oil tank 121 is also used to guarantee suitable viscosity of the lubrication oil for the lubrication oil pump 122.

Depending on the settings of the used lubrication control system, the splash lubrication can be stopped when the circulating lubrication is started when the first set temperature value of the lubrication oil is reached, or both the splash lubrication and circulating lubrication can be used simultaneously. During this simultaneous splash and circulating lubrication, the lubrication oil level within the first and second gear stages in maintained at suitable level for splash lubrication by controlling the controllable valves 128 and 129 located in the lubrication oil channels 126 and 127 for draining the lubrication oil from the gear stages.

If both the splash lubrication and circulating lubrication are used simultaneously after the first set temperature is achieved, then in the lubrication control system is also equipped with a second set temperature value for the temperature of the lubrication oil. The second set temperature value for the temperature of the lubrication oil is higher than the first set temperature value, and when the temperature of the lubrication oil reaches this second set temperature value, the lubrication control system switches the lubrication of the gear unit from simultaneous splash lubrication and circulating lubrication to circulating lubrication only. The change to circulating lubrication is achieved by removing the excess lubrication oil required for splash lubrication from the frames of the first and second gear stages and thus lowering the level of the lubrication oil within these frames below the lower edges of the gear rings 102 and 106 through controlling of the controllable valves 128 and 129.

Temperature ranges of the lubrication fluid for changing the lubrication type of the gear unit can be, for example, following:

when the temperature of the lubrication fluid is below +5° C., only the splash lubrication is used,
when the temperature of the lubrication fluid is from +5° C. to +40° C., both the splash lubrication and the circulating lubrication are used, and
when the temperature of the lubrication fluid is above +40° C., only the circulating lubrication is used.

In relation to the above temperature ranges it is to be noted that those rages are typical ones that used in the solution in accordance with the present invention, with variance of +/−5° C. However, the exact limit temperatures for changing the lubrication type of the gear unit are defined based on selected lubrication components and the used lubrication fluid. The normal operating temperature of the lubrication fluid in this type of gear units is from +30° C. to +70° C.

The lubrication system of FIG. 1 is advantageously controlled with an automatic lubrication control system, which follows the temperature of the lubrication oil through the temperature sensors A-C and changes the lubrication type on basis of the measured temperatures and set temperature values fed into the automatic lubrication control system through control of the lubrication pump 122 and the controllable valves 128 and 129.

Even though in the FIGURE the invention is described as applied to a planet gear unit, it is to be noted, that the invention can be used in any type of gear unit suitable for using both splash lubricating and circulating lubrication. These types of gear units comprise, but are not restricted to, different type of planetary gear units and different type of bevel gear units, for example.

Further, the specific example provided in the description given above should not be construed as limiting. Therefore, the invention is not limited merely to the embodiments described above.

The invention claimed is:

1. A gear unit comprising:
    a first shaft and a second shaft for connecting to an external mechanical system,
    at least one gear stage between the first and second shafts,
    a channeling for directing lubrication fluid to flow through the at least one gear stage and bearings of the gear,
    a lubrication pump for pumping the lubrication fluid to the channeling so as to provide circulation lubrication,
    a lubrication fluid sump for containing the lubrication fluid so as to provide splash lubrication capable of lubricating the gear unit independently of operation of the circulation lubrication,
    a controllable valve system for emptying the lubrication fluid sump so as to deactivate the splash lubrication, and
    wherein the gear unit comprises at least one temperature sensor for measuring temperature of the lubrication fluid, and means for changing the lubrication of the gear unit between the circulation lubrication and the splash lubrication based on the temperature measurement of the lubrication fluid.

2. A gear unit according to claim 1, wherein means for changing the lubrication of the gear unit comprises an automatic lubrication control system, which changes the lubrication of the gear unit between circulation lubrication and splash lubrication on basis of the temperature measurement from the at least one temperature sensor.

3. A gear unit according to claim 2, wherein the automatic lubrication control system comprises a preset lubrication fluid temperature value for changing the lubrication of the gear unit.

4. A gear unit according to claim 2, wherein the automatic lubrication control system comprises at least two preset lubrication fluid temperature values for changing the lubrication of the gear unit.

* * * * *